Sept. 20, 1955

L. M. HARRIS 2,718,572

STACKED THERMOSTAT

Filed Jan. 4, 1954

LEE M. HARRIS INVENTOR
BY Stuart R. Peterson ATTORNEY ively to electric switches of the thermostatic variety and pertains more particularly to a stacked thermostat having a bimetallic element mounted in such a way that it will respond readily to temperature changes of the body or member to which the thermostat is affixed.

United States Patent Office 2,718,572
Patented Sept. 20, 1955

2,718,572
STACKED THERMOSTAT

Lee M. Harris, Oak Park, Ill., assignor to General Mills, Inc., a corporation of Delaware Application January 4, 1954, Serial No. 401,797

9 Claims. (Cl. 200—138)

This invention relates to electric switches of the thermostatic variety and pertains more particularly to a stacked thermostat having a bimetallic element mounted in such a way that it will respond readily to temperature changes of the body or member to which the thermostat is affixed.

In electrically heated appliances, it is extremely desirable to control the temperature of the heated member in a rapid fashion without any appreciable delay or temperature lag. To this end various endeavors have been undertaken which seek to locate the bimetallic element as close to the heated surface as possible. Functionally, the desired result has been achieved by so doing in some instances, but only at the expense of entailing added assembly costs, for the thermostat literally has to be built up piece by piece at the time the appliance itself is assembled. Not only does this procedure lessen the opportunity for fully utilizing automatic assembling techniques but has the additional disadvantage of not permitting the thermostat to be pretested and possibly rejected if it does not conform to required standards.

Accordingly, one object of the instant invention is to provide a stacked thermostat constructed so that the bimetal thereof may actually contact the heated member for producing a quick temperature response. In this connection it is to be noted that the thermostat is formed as a distinct and separate unit capable of being independently tested prior to its mounting on the appliance with which it is to be used.

It is also an aim of the invention, which is a corollary to the preceding object, to avoid subjecting the insulating washers of the thermostat to damaging compressive forces when affixing the thermostat to the appliance, even though the bimetal of the thermostat is placed directly against the surface to be heated.

Another object of the invention is to provide a thermostat which is inexpensive to manufacture, easy to install, reliable, and readily adjustable by the user. Furthermore, it is within the contemplation of the invention to utilize a special flange of a varying radius or size so that the bimetallic element may be caused to deflect or operate within various temperature ranges, the flange thus envisaged being capable of being angularly oriented for the approximate temperature range by the factory at the time the thermostat is installed.

Other objects will be in part obvious and in part pointed out more in detail hereinafter.

The invention accordingly consists in the features of the construction, combination of elements, and arrangements of parts which will be exemplified in the construction hereinafter set forth and in the scope of the application which will be indicated in the appended claims.

In the drawings, Figure 1 is a cross sectional view of the thermostat shown in conjunction with an electrically heated iron;

Figure 1:
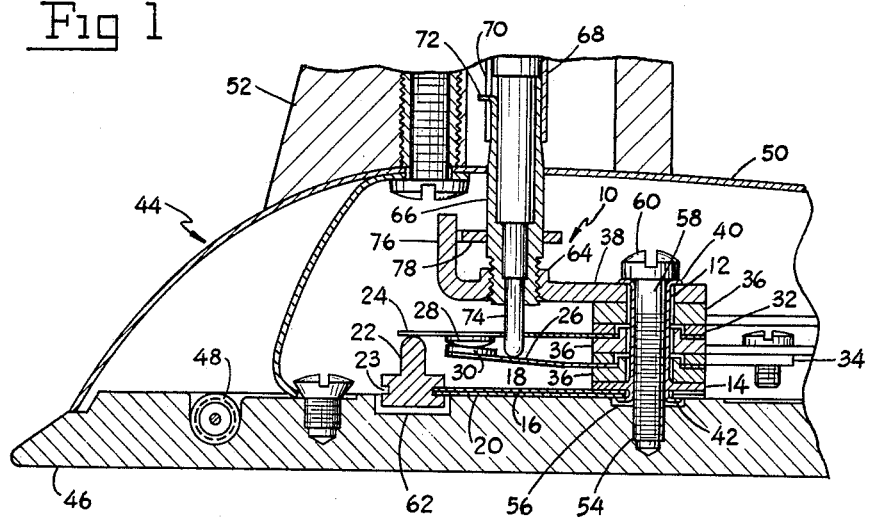
Figure 2:
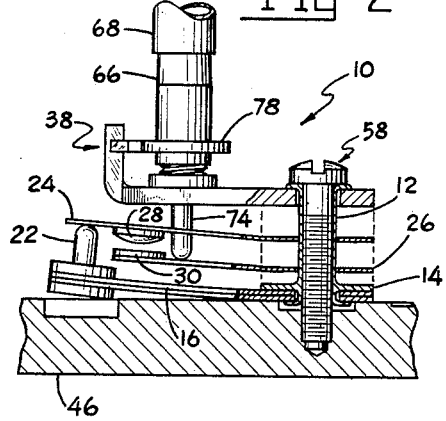
Fig. 2 is a fragmentary view corresponding to Fig. 1 but with the thermostat in a different operative position.
Figure 4:
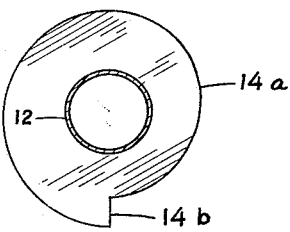
Fig. 4 is a detailed view of the distinguishing member, partly in section, utilized in the embodiment of Fig. 3.

Referring now in detail to the drawings, Figs. 1 and 2 in particular, the stack thermostat is designated in its entirety by the reference numeral 10 and includes a tubular bushing 12 equipped with a circular flange 14 intermediate its upper and lower ends. Also forming a part of the thermostat 10 is a bimetallic element 16 having a strip 18 of low thermal coefficient of expansion such as Invar and having a strip 20 of higher thermal coefficient of expansion such as brass, the two strips being joined together to intimate surface contact as is conventional in the manufacturing of such bimetallic elements. One end of the bimetal 16 is apertured and received over the tubular bushing 12 whereas the other or free end is bifurcated for the accommodation of a stud button such as a member of ceramic or other insulating material. By reason of a circumferential groove 23 in the cylindrical surface of the stud button 22, it will be seen that the button may be readily crimped into place.

Proceeding further with the description of the thermostat 10, the thermostat additionally includes a pair of contact arms 24 and 26, the upper arm being biased downwardly and the lower arm upwardly, the two arms having contacts 28 and 30. Superjacent the attached ends of the contact arms 24 and 26 are terminals 32 and 34 by which an electrical circuit may be completed through a heating element subsequently to be referred to. Inasmuch as the contact arms 24 and 26 must be electrically insulated from each other, it is within the contemplation of the invention to provide a plurality of insulating washers 36 which are sandwiched or interleaved between the component parts constituting the thermostat 10. Above the uppermost insulating washer 36 is a bracket member 38, the bracket member being for the purpose of carrying appropriate adjusting mechanism by which the temperatures at which the thermostat functions may be initially set or adjusted for. In order to render the contact arms 24, 26, the bracket 38 and the various insulating washers 36 captive, the upper end of the tubular bushing 12 is enlarged such as by staking, riveting, or spinning over the exposed end of the bushing at 40. Similarly, the lower end 42 is enlarged so that the bimetallic member 16 is securely held in place. Owing to the staking at the locations 40 and 42, it will be appreciated that undesired clearance is adequately taken up and that the parts are snugly retained in proper juxtaposition to provide thereby a unitary thermostatic structure.

To illustrate an exemplary use of the thermostat 10, the thermostatic structure is shown in association with an electrically heated iron 44 although it will be realized that the appliance might be any other electrically heated appliance such as a deep fat fryer, a waffle baker, or the like. Included as part of the iron 44 is a soleplate 46, a heating element 48, a casing 50, and a hollow handle 52 secured in a detachable manner to the casing 50. From an inspection of Fig. 1 it can be discerned that a tapped recess 54 is provided in the soleplate and that this recess is counterbored at 56 for the express purpose of accommodating the staked material belonging to the lower end 42 of the tubular bushing 12. Not only should the counterbore 56 be deep enough to accommodate or receive the staked material without interference but it should be of sufficiently small diameter, less than the flange 14, so that there is provided a region circumjacent the counterbore for the purpose of forming what might be termed an annular shoulder for absorbing the reaction of the flange 14 as will presently be made manifest. To retain the thermostatic structure 10 in proper position, a bolt 58 may be threaded into the tapped recess 54, the bolt being equipped with a head 60 which abuts against the upper end 40 of the tubular bushing 12. It is to be noted that with the construction forming the subject matter of the instant invention little or no compressive forces are imposed upon the frangible washers 36 when the bolt 50 is tightened, since the tightening force is transmitted from the head 60 directly to the flange 14 via the bushing 12, thereby minimizing the likelihood of cracking these washers during the attachment of the thermostat to the appliance. Also, particularly due to the mechanical configuration of the stud button 22, it is desirable that a further recess 62 be formed in the soleplate 46 so that the base of the stud button 22 may be accommodated. From the foregoing it will be recognized that the bimetallic element 16 is permitted to confront the electrically heated upper surface of the soleplate 46, the provision of the counterbore 56 assuring that the lower side of the bimetal will be in intimate contact with the soleplate.

The bracket 38, which is supported by means of the tubular bushing 12, extends radially, and at an offset point spaced from the bushing 12, an aperture 64 is provided which has threadedly retained therein a sleeve member 66. The upper end of the sleeve 66 is telescoped within an adjusting tube 68 having a longitudinal slot 70 which receives a lateral protrusion or lug 72 formed on the sleeve itself. In this way considerable leeway or manufacturing tolerances may be introduced in the fabrication of the parts without detracting from the operational utility thereof. Telescopically received in the lower end of the sleeve 66 is a stud 74 of insulating material, the stud being intended to engage the contact arm 26 and position it initially for the temperature at which the bimetallic element causes separation of the contacts 28 and 30. The distal end of the bracket 38 is upturned at 76 to provide a stop element which cooperates with a collar 78 encircling the sleeve 66. In this way the amount of vertical movement possible by the stud 74 is limited.

From the foregoing description it is thought that the operation of my thermostat structure will be readily understood. However, it should be pointed out that once the contacts 28 and 30 have remained closed for a sufficient period of time, the heating element 48 will then have had opportunity to heat adequately the soleplate 46. Heat present in the soleplate is conducted into the bimetallic element 60 and by virtue of the fact that the upper strip 18 is of relatively low thermal expansive material, the heat transmitted to the bimetal will cause the bimetal to warp upwardly. Since the bimetal 16 is restrained owing to the presence of the flange 14, the point at which the bimetal begins to bend is determined by the particular radius of the flange 14. As will be shortly pointed out, it is possible to utilize a flange having a varying radius so that the particular angle at which the flange is disposed is determinative of the point at which bending begins and hence governs the temperature range in which the thermostat 10 operates. It can not be emphasized too strenuously at this time that the bimetal 16 is in intimate contact with the soleplate 46 and also that the thermostat 10 is of a unitary construction, thereby facilitating the assembly of the thermostatic structure on the appliance with which it is to be associated and also permitting the pre-testing of the thermostat 10 to make sure that it functions within the proper temperature limits.

Figure 3:
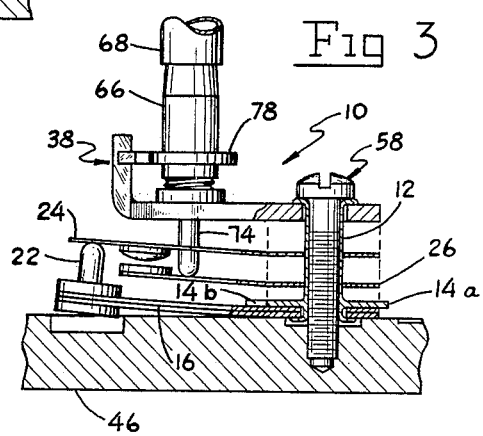
Fig. 3 is a view similar to Fig. 2 but showing a slightly different modification which the invention may assume.

Passing now to a description of the modification depicted in Figure 3, it is to be noted that this embodiment is quite similar to that just described, the only real difference residing in the substitution of a flange 14a of increasing radius or involute configuration which forms a notch or shoulder 14b for the flange 14 previously referred to. By utilizing a flange such as that represented by the numeral 14a, it will be apparent that the angular position which the flange assumes is determinative of the point at which the bimetal begins to deflect upwardly. In Figure 3, the flange 14a is turned so that a maximum radius is presented to the upper side of the bimetallic element 16. Compared with the radius of the flange 14 of Figs. 1 and 2, the particular segment of the flange 14a shown in use in Fig. 3 extends outwardly farther than that of the flange 14 and in this manner the bimetallic element is restrained to a greater extent and hence will operate at higher temperatures than the bimetal depicted in Figs. 1 and 2. Of course, if the tubular bushing 12 provided with the flange 14a is rotated to any other preferred angle, then the radius presented to the upper surface of the bimetal 16 will be changed and this will, of course, cause a corresponding change in the temperature range at which the bimetal deflects. It might be added that it is not contemplated that this flange be used in lieu of the control made possible by the employment of the stud 74 and its associated adjusting mechanism. Instead it is felt that the use of a varying dimensioned flange will find its fullest utility at the time the thermostat 10 is assembled at the factory and that various operating temperature ranges can be procured readily by merely turning the flange 14a to a preferred angular position. It might be mentioned that the flange 14a need not be integral with the bushing 12 but might loosely encircle said bushing directly beneath an integral flange such as the flange 14 depicted in Fig. 2, the flange 14a of course projecting beyond the integral flange. When so arranged, only the loose flange in the form of an irregularly shaped washer would have to be rotated instead of the entire bushing to give various operating ranges.

As many changes could be made in the above construction and many apparently widely different embodiments of the invention could be made without departing from the scope thereof, it is intended that all matter contained in the above description or shown in the accompanying drawings shall be interpreted as illustrative and not in any limiting sense.

It is also to be understood that the language used in the following claims is intended to cover all of the generic and specific features of the invention herein described and all statements of the scope of the invention which, as a matter of language, might be said to fall therebetween.

I claim:

1. A stacked thermostat comprising an elongated member having enlarged ends and integral intermediate flange means, a bimetallic element having one end interposed between the flange and one enlarged end, and a plurality of contact arms and insulating washers therebetween interposed between said flange and the other enlarged end.

2. A stacked thermostat comprising an elongated member having enlarged ends and integral intermediate flange means, a bimetallic element composed of two metals having unequal thermal expansion characteristics interposed between the flange means and one enlarged end, the side of said bimetal having the lower expansion characteristic being adjacent said flange means, and a plurality of contact arms and insulating washers therebetween interposed between said flange means and the other enlarged end.

3. A stacked thermostat comprising an elongated member having enlarged ends and intermediate flange means, a bimetallic element composed of two metals having unequal thermal expansion characteristics interposed between the flange means and one enlarged end, said flange means including a flange of varying width so that a particular width may be utilized to determine the locus at which said bimetallic element begins to bend, the side of said bimetal having the lower expansion characteristic being adjacent said flange means, and a plurality of contact arms and insulating washers interposed between said flange means and the other enlarged end.

4. A stacked thermostat comprising an elongated member having enlarged ends and intermediate flange means, a bimetallic element composed of two metals having unequal thermal expansion characteristics interposed between the flange means and one enlarged end, said flange means including a flange of varying radius to form a flange of involute configuration to determine the locus at which said bimetallic element begins to bend, the side of said bimetal having the lower expansion characteristic being adjacent said flange means, and a plurality of contact arms and insulating washers therebetween interposed between said flange means and the other enlarged end.

5. A stacked thermostat comprising a tubular bushing staked at each end and provided with an integral intermediate flange, a bimetallic element having one end interposed between the flange and one staked end, and a plurality of contact arms and insulating washers interposed betwen said flange and the other staked end.

6. In combination with a member the temperature of which is to be controlled within preferred limits, a stacked thermostat comprising a tubular bushing staked at each end and provided with an integral intermediate flange, a bimetallic element having one side in a proximal relation with said member and one end interposed between the flange and one staked end, said member being recessed for the accommodation of the staked material of said one end of the bushing, and a plurality of interleaved contact arms and insulating washers interposed between said flange and the other staked end.

7. In combination with a member the temperature of which is to be controlled within preferred limits, a stacked thermostat comprising a tubular bushing staked at each end and provided with an integral intermediate flange, a bimetallic element having one side bearing against said member and one end interposed between the flange and one staked end, said member having a tapped recess and a counterbore for the accommodation of the staked material of said one end of the bushing, the diameter of said counterbore being less than the diameter of said flange to provide a bearing surface for said bimetal circumjacent said recess, a plurality of interposed contact arms, insulating washers, and a bracket member interposed between said flange and the other staked end, and a bolt member having one end threadedly received in said tapped recess and a head at the other end for engaging the staked material at said other end of the bushing.

8. The combination in accordance with claim 7 in which the low expansion side of said bimetallic element is adjacent the flange.

9. The combination in accordance with claim 8 in which the diameter of said flange is of varying size to form a flange of involute configuration.

References Cited in the file of this patent

UNITED STATES PATENTS

| | | |
|---|---|---|
| 2,317,033 | Dafforn | Apr. 20, 1943 |
| 2,518,595 | Bletz | Aug. 15, 1950 |
| 2,567,138 | Weiland | Sept. 4, 1951 |